United States Patent [19]
Ando

[11] Patent Number: 5,923,633
[45] Date of Patent: Jul. 13, 1999

[54] OPTICAL REPRODUCING DEVICE COMPATIBLE WITH MULTIPLE MEDIA RECORDING DENSITIES

[75] Inventor: Nobuhiko Ando, Tokyo, Japan

[73] Assignee: Sony Corporation, Tokyo, Japan

[21] Appl. No.: 08/786,123

[22] Filed: Jan. 7, 1997

[30] Foreign Application Priority Data

Jan. 23, 1996 [JP] Japan ................................ 8-009049
Sep. 6, 1996 [JP] Japan ................................ 8-237041

[51] Int. Cl.⁶ ........................................................ G11B 7/00
[52] U.S. Cl. ........................................... 369/112; 369/109
[58] Field of Search ................................... 369/100, 109, 369/110, 112, 93, 94, 44.37, 54, 58, 44.25, 44.26, 44.27, 44.29

[56] References Cited

U.S. PATENT DOCUMENTS

| | | | |
|---|---|---|---|
| 5,111,449 | 5/1992 | Kurata et al. | 369/112 X |
| 5,425,015 | 6/1995 | Taniguchi et al. | 369/116 |
| 5,446,565 | 8/1995 | Komma et al. | 369/112 X |
| 5,513,164 | 4/1996 | Tanaka et al. | 369/110 X |
| 5,708,638 | 1/1998 | Braat et al. | 369/112 |

FOREIGN PATENT DOCUMENTS

| | | | |
|---|---|---|---|
| 0186017 | 7/1986 | European Pat. Off. | G11B 7/24 |
| 7-57271 | 3/1995 | Japan . | |

*Primary Examiner*—Paul W. Huber
*Attorney, Agent, or Firm*—Jay H. Maioli

[57] ABSTRACT

A reproducing apparatus of an optical recording medium which is capable of reproducing at least two types of optical recording mediums including an optical recording medium, such as a so-called compact disk composed of a substrate having a thickness of 1.2 mm and an optical recording medium composed of a substrate having a thickness of 1.0 mm or smaller has a light source, an objective lens and a control portion. The light source emits light beams having a wavelength of 700 nm or shorter. The objective lens condenses the light beams emitted from the light source through the substrate of the optical recording medium. The objective lens has a numerical aperture of 0.45 or greater. The control portion controls the surface on which the light beams are focused by the objective lens to be positioned between the paraxial image surface and the minimum-wave-aberration image surface when data is recorded and/or reproduced to and from the optical recording medium composed of the substrate having a thickness of 1.0 mm or smaller.

11 Claims, 11 Drawing Sheets

OPTICAL REPRODUCING DEVICE COMPATIBLE WITH MULTIPLE MEDIA RECORDING DENSITIES

BACKGROUND OF THE INVENTION

1. Field of the Invention:

The present invention relates to a reproducing apparatus of an optical recording medium and an optical pickup device, and more particularly to a reproducing apparatus of an optical recording medium which is capable of reproducing an information signal from at least two types of optical recording mediums using an optical pickup device.

2. Background of the Invention

In recent years, the recording density of an optical disk, which is capable of serving as a storage unit tor a computer and a package media for music and image information, has been increased. In order to increased the recording density, a variety of contrivances have been considered in which the NA (Numerical device is enlarged and in which the diameter of the beam spot is reduced by shortening the wavelength of the light beam.

In general, an optical disk using a wavelength of 635 nm or 650 nm, having a NA of 0.45 or greater and capable of recording data at a high density includes a substrate having a thickness of, for example, 0.6 mm which is smaller than the thickness of 1.2 mm of the substrate of the conventional optical disk in order to enlarge an allowable error (hereinafter called "tolerance") against deterioration of the information signal occurring due to skew or the like.

It is leads to a fact that plural types of optical disks having different specifications, such as formats and thicknesses of the substrates, exist on the market. However, users have a requirement for reproducing the plural types of the available optical disks by one optical-disk reproducing apparatus. A compatible optical disk reproducing apparatus has been considered to be employed which is capable of reproducing optical disks having different optical specifications, such as thicknesses of the substrates.

When the conventional optical pickup device reads and reproduces an information signal from an optical disk composed of a substrate having a thickness of 1.2 mm by an objective lens adapted to be capable of forming a beam spot having all optimum shape on an optical disk composed of a substrate having a thickness of 0.6 mm and having data recorded at a high density, spherical aberration that is generated and attributable to the difference in the thickness of the substrate raises a problem that a satisfactory information signal cannot be obtained.

Accordingly, a portion of the conventional optical pickup devices has a structure having a plurality of objective lenses consisting of a first objective lens adapted to the optical disk for use in a high recording density operation arid composed of the substrate having the thickness of 0.6 mm, and a second objective lens composed of the substrate having the thickness of 1.2 mm. Thus, either of the two objective lenses is switched to be adaptable to the objective lens from which information signals are attempted to be read and reproduced so that the information signals are read and reproduced. However, the above-mentioned optical pickup device has a problem in that the control and the structure for switching the objective lenses become too complicated and the manufacturing cost cannot be reduced.

Another portion of the conventional optical pickup devices uses a hologram to employ an objective lens having two focal distances, using either beam spot to be adaptable to the thickness of the substrate of the optical disk. However, the optical pickup device encounters a problem that the cost for manufacturing the objective lens having two focal distances cannot be reduced and reliability is unsatisfactory.

SUMMARY OF THE INVENTION

It is therefore an object of the present invention to provide a reproducing apparatus of an optical recording medium which resolves the above-mentioned problem.

It is another object of the present invention to provide an optical pickup device which resolves the above-mentioned problem.

According to the present invention, there is provided a reproducing apparatus of an optical recording medium. The reproducing apparatus reproduces at least two types of optical recording mediums respectively composed of a substrate having a thickness of 1.2 mm and a substrate having a thickness of 1.0 mm. The reproducing apparatus has a light source, an objective lens and a control portion. The light source emits light beams having a wavelength of 700 nm or shorter. The objective lens condenses the light beams emitted from the light source through the substrate of the optical recording medium. The objective lens has a numerical aperture of 0.45 or greater. The control portion controls the surface on which the light beams are focused by the objective lens to be positioned between the paraxial image surface and the minimum-wave-aberration image surface when data is recorded and/or reproduced to and from the optical recording medium composed of the substrate having a thickness of 1.0 mm or smaller.

According to the present invention, there is provided an optical pickup device. The optical pickup device is used to read at least two types of optical recording mediums respectively composed of a substrate having a thickness of 1.2 mm and a substrate having a thickness of 1.0 mm or smaller. The reproducing apparatus has a light source and an objective lens. The light source emits light beams having a wavelength of 700 nm or shorter. The objective lens condenses the light beams emitted from the light source through the substrate of the optical recording medium. The objective lens has a numerical aperture of 0.45 or greater. When data is recorded and/or reproduced to and from the optical recording medium composed of the substrate having the thickness of 1.0 mm or smaller, the surface on which the light beams are focused by the objective lens is positioned between the paraxial image surface and the minimum-wave-aberration image surface.

DESCRIPTION OF THE INVENTION

An optical pickup device according to the present invention will now be described with reference to the drawings. An optical pickup device 3 according to an embodiment of the present invention is adapted to an apparatus 2 for reproducing an optical disk structured, for example, as shown in FIG. 1.

The optical disk reproducing apparatus 2 is a so-called compatible optical disk reproducing apparatus which is capable of reproducing information signals from both of an optical disk 1, such as a compact disk, composed of a substrate having a thickness t of 1.2 mm and a high recording density optical disk composed of a substrate having a thickness t of 0.6 mm.

Figure 2:
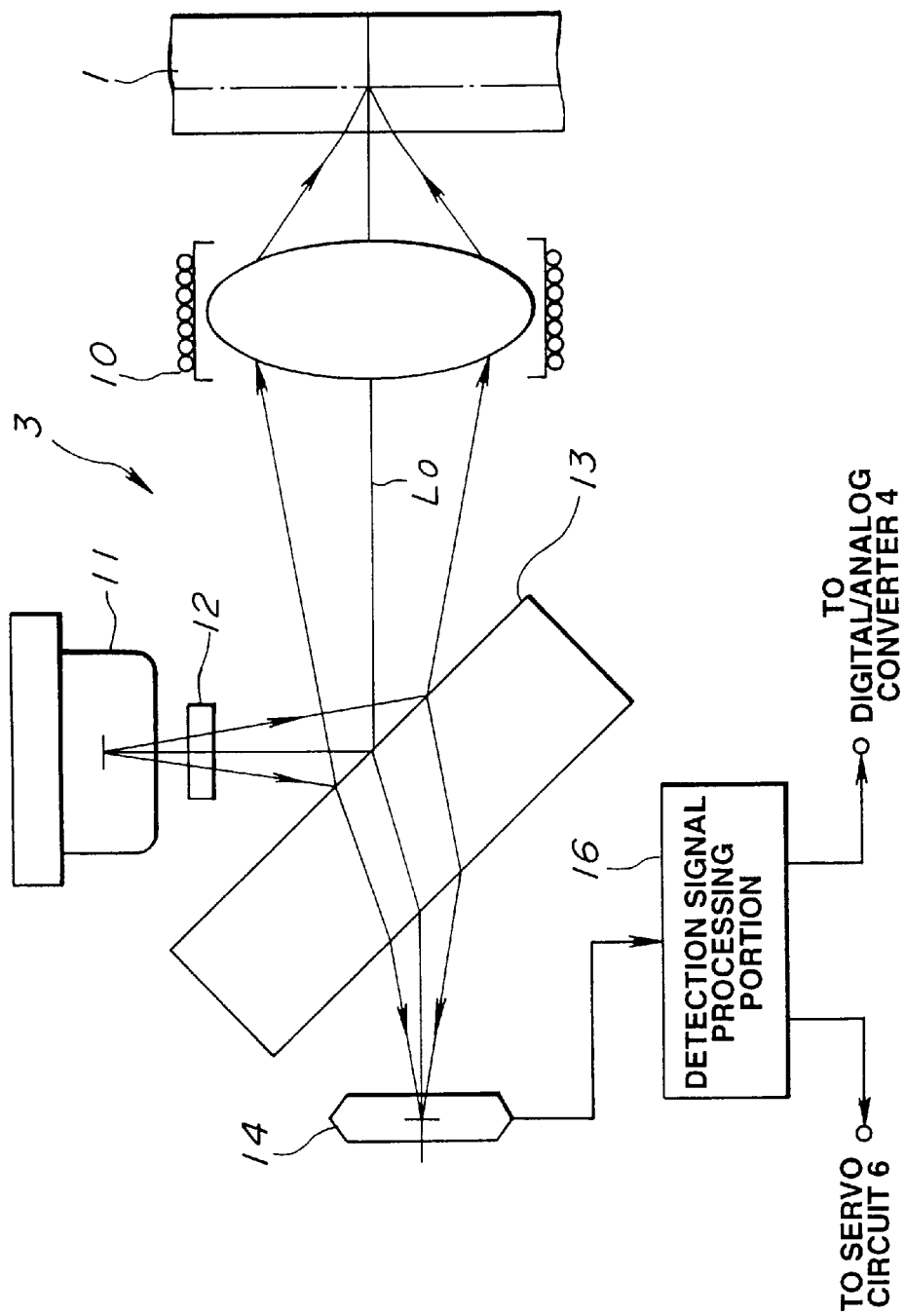
FIG. 2 is a schematic view showing the structure of the optical pickup device.

As shown in FIG. 2, the optical pickup device 3 has a light source 11, such as a laser diode, for emitting a light beam, an objective lens 9 capable of forming a beam spot on an information signal layer of two types of optical disks by applying a light beam to the information signal layer, a photo detector portion 14 which receives the light beam reflected by the optical disk so as to convert the light beam into an electric signal and a detection signal processing portion 16 for obtaining a tracking error signal from the detection signal, a focusing error signal and a main reproduction signal from a detection signal supplied from the photo detector portion 14.

Figure 1:
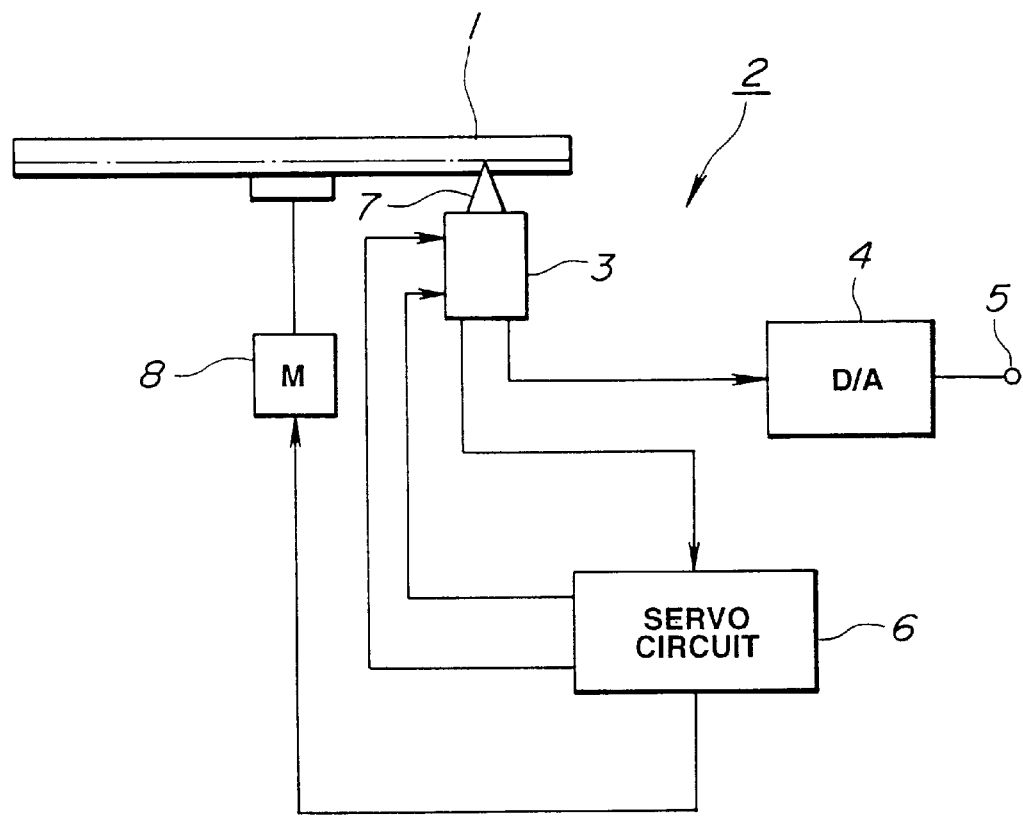
FIG. 1 is a schematic view showing the structure of an optical disk reproducing apparatus to which an optical pickup device according to an embodiment of the present invention is applied.

The tracking error signal and the focusing error signal obtained by the detection signal processing portion 16 of the optical pickup device 3 are supplied to a servo circuit 6 shown in FIG. 1. In accordance with the tracking error signal and the focusing error signal, the servo circuit 6 performs tracking control for controlling movement of an objective lens, to be described later, into a direction of a plane perpendicular to an optical axis of the objective lens, and focusing control for controlling movement of the objective lens into a direction running parallel to the optical axis of the objective lens.

The optical pickup device 3 is structured such that a focus drive signal is supplied to an actuator 10 holding the objective lens 9 to move the objective lens 9 in directions in which the objective lens 9, for example, approaches the information signal layer of the optical disk 1 and moves away from the same, so that focus control is performed. Moreover, a low frequency region of the tracking error signal is extracted to generate a thread drive signal with which a thread mechanism is operated in order to move the overall body of the optical pickup device 3 in, for example, a radial direction of the optical disk 1.

The main reproduction signal obtained by the detection signal processing portion 16 is subjected to an EFM demodulation process and a CIRI decoding process so as to be formed into reproduction digital data, and then converted into an analog signal by a digital/analog converter 4. The analog signal is transmitted through an output terminal 5. A servo circuit 6 controls rotations of a spindle motor 8 in accordance with clocks obtained from the main reproduction signal.

The detailed structure and operation of the optical pickup device 3 will now be described. Referring to FIG. 2, a diffuse beams emitted from a light source 11 are diffracted by a diffraction grating 12 so as to be separated into three beams consisting of 0-order beam and ±1-order beams. Each light beam diffracted by the diffraction grating 12 is reflected by a beam splitter 13 so as to be allowed to propagate to the objective lens 9. The light beam emitted from the light source 11 is, by the objective lens 9, condensed and focused on the information signal layer of the optical disk 1 through the substrate of the optical disk 1, the information signal layer serving as a signal recording surface. The objective lens 9 is subjected to the tracking control process and the focusing control process by the actuator 10 to condense the light beam above to the information signal layer of the optical disk 1 so as to form three spots. Three reflected beams from the information signal layer of the optical disk 1 are allowed to pass through the objective lens 9 and the beam splitter 13, and then caused to reach the light receiving surface of the photo detector portion 14.

Although FIG. 2 shows only the optical disk 1, such as a compact disk, including a substrate having the thickness t of 1.2 mm, the optical pickup device 3 is able to reproduce both of the foregoing optical disk 1 and a single-layer optical disk including a substrate having thickness t of 0.6 mm and an information signal layer located at a position of 0.6 mm from the signal reading surface. Moreover, the optical pickup device 3 is able to reproduce an information signal from an information signal layer of a single-layer optical disk including a substrate having thickness t of 0.8 mm and an information signal layer of a double-layer optical disk formed by laminating two single-layer optical disks each including a substrate having thickness t of 0.6 mm.

The objective lens 9 of the optical pickup device 3 is structured such that a diffraction limit light beam can be obtained on the signal recorded surface of the optical disk in a case where the numerical aperture NA is 0.45 or greater, the thickness t of the substrate of the optical disk is 1 mm or smaller and the wavelength λ of the light beam emitted from the light source 11 is 700 nm or shorter. That is, the objective lens 9 according to this embodiment is structured such that a diffraction limit light beam, with which a minimum diameter of a beam spot can be obtained without any aberration, can be obtained on the signal recorded surface of the optical disk in a case where the numerical aperture NA is 0.53, the wavelength λ of the light beam is 532 nm and the thickness t of the substrate of the optical disk is 0.6 mm.

The diameter of the beam spot obtainable from the objective lens 9 can be calculated by the following formula:

$$1.22 \cdot \lambda/NA$$

The diameter is 1.22 μm in this case.

Since the optical disk 1, such as a compact disk, generally has the numerical aperture NA of 0.45 and the wavelength of the light beam is 780 nm, the diameter of the beam spot is 2.11 μm. Since the diameter of the beam spot obtainable from the optical pickup device 3 is therefore smaller than that formed on the optical disk 1, information signals recorded more densely can be reproduced.

As for deterioration in the information signal occurring due to skew of the optical disk, the tolerance is narrowed in inverse proportion to the numerical aperture NA. Since the tolerance is enlarged in inverse proportion to the thickness t of the substrate of the optical disk, the tolerance can be improved two times greater than that of the optical disk 1 including the substrate having the thickness t of 1.2 mm when the thickness of the substrate of the optical disk is made to be 0.6 mm.

The recording capacity of the optical disk is made to be larger than that of the optical disk 1 when the wavelength λ of the light beam is shortened, the numerical aperture NA of the objective lens is enlarged and the thickness t of the substrate of the optical disk is enlarged. Thus, an optical disk on which information can densely be recorded can be realized.

When an information signal is reproduced by the optical pickup device 3 from the optical disk 1 including the substrate having the thickness t of 1.2 mm by using the same wavelength from the same light source 11 and the same objective lens for use when an information signal is read and reproduced from the high density recording optical disk, the difference (1.2−0.6) mm in the thickness t of the substrate of the optical disk causes a spherical aberration to be generated unintentionally. Therefore, the optical pickup device encounters a problem in that the light beams cannot converge to one point on the focal plane and thus the diameter of the beam spot is unintentionally enlarged, as shown in FIG. 3.

In general, when the beam spot diameter is enlarged, the MTF (Modulation Transfer Function) of an optical pickup device indicating the performance for reading an information signal considerably deteriorates. In this case, the quality of the reproduced information signal deteriorates.

Figure 3:
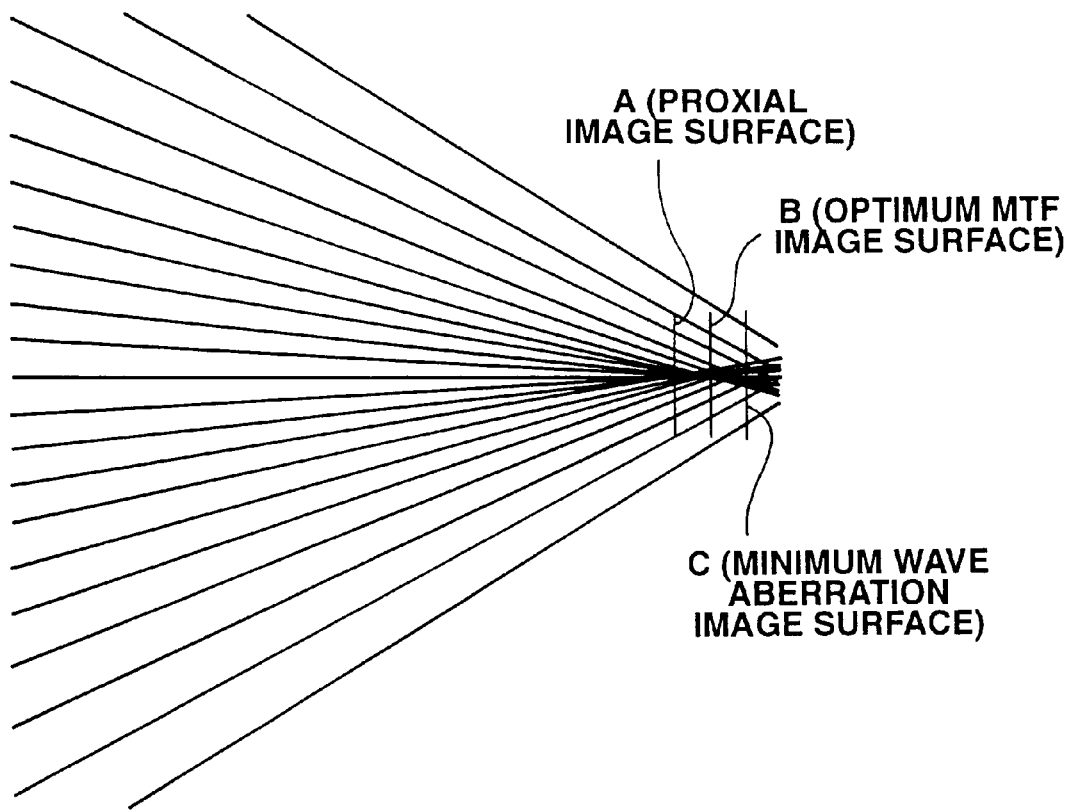
FIG. 3 is a diagram showing an image surface on which a spherical aberration takes place to explain the position of an objective lens of the optical pickup device.

However, if the wavelength λ of the light beam is 700 nm or shorter, an MTF enabling an information signal to be read and reproduced can be obtained from a beam spot encountering spherical aberration by locating image-formation surface B between a paraxial image surface A and the minimum-wave-aberration image point C, as shown in FIG. 3. Note that the image-formation surface B located between the paraxial image surface A and the minimum-wave-aberration image surface C is hereinafter called an "optimum MTF image surface B".

The MTF on each image surface obtainable from the optical pickup device 3 will now be described with reference to FIG. 4 and FIGS. 5 and 6. The ordinate axis of the graphs shown in each of FIGS. 4 through 6 stands for the MTF, while the abscissa stands for the spatial frequencies. Continuous lines shown in FIGS. 4 to 6 indicate MTF curves, while dashed lines indicate diffraction limit stigmatic MTF.

Figure 4:
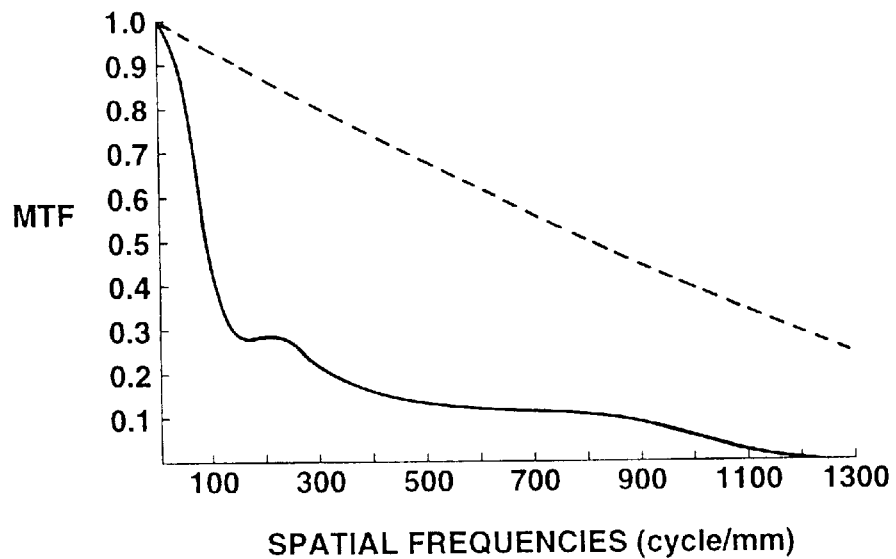
FIG. 4 is a graph showing an MTF curve of optimum MTF surfaces realized when an optical disk having t=1.2 mm has been reproduced by all objective lens of the optical pickup device set such that $\lambda=532$ nm, NA=0.53 and t=0.6 mm.

As can be understood from FIG. 4, the MTF of the MTF curve of the optimum MTF image surface B is not made to be zero but spreads to a spatial frequency region not lower than 1000 cycle/mm. As can be understood from the MTF curve of the paraxial image surfaces A shown in FIG. 5, the MTF is unsatisfactorily made to be zero in a spatial frequency region not lower than 800 cycle/mm. As can be understood from the MTF curve of the minimum-wave-aberration image surfaces C, the MTF is made to be zero in a spatial frequency region in the vicinity of 300 cycle/mm, as shown in FIG. 6.

Figure 5:
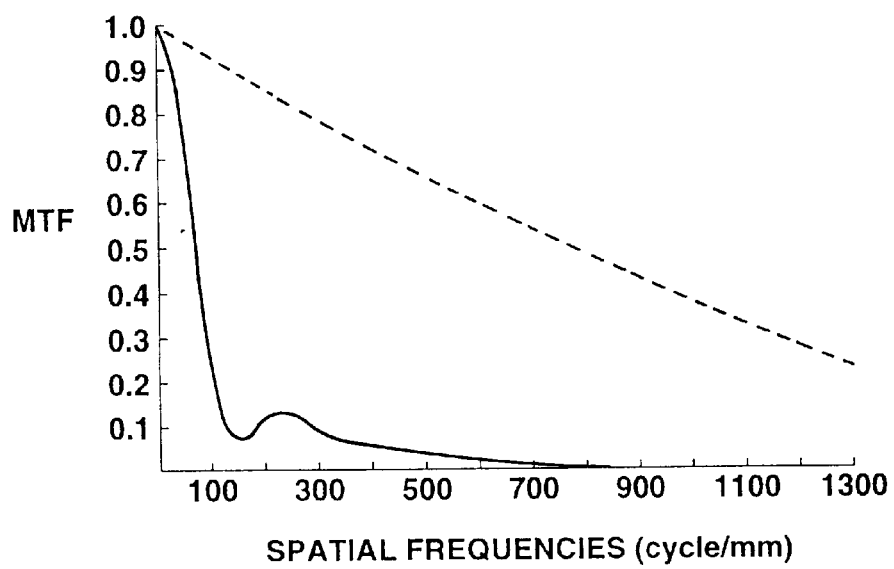
FIG. 5 is a graph showing an MTF curve of paraxial image surfaces realized when the optical disk having t=1.2 mm has been reproduced by an objective lens of the optical pickup device set such that $\lambda=532$ nm, NA=0.53 and t=0.6 mm.
Figure 6:
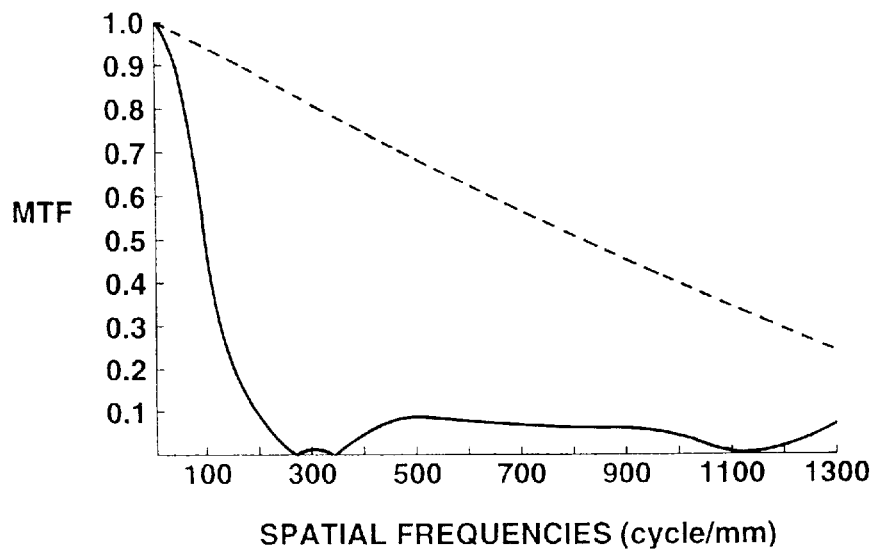
FIG. 6 is a graph showing an MTF curve of minimum-wave-aberration image surfaces realized when the optical disk having t=1.2 mm has been reproduced by an objective lens of the optical pickup device set such that λ=532 nm, NA=0.53 and t =0.6 mm.

As described above, the MTF obtainable from the optical pickup device 3 is reduced as compared with a case where no aberration takes place at any position, as shown FIGS. 4, 5 and 6. That is, in a case where an information signal is read and reproduced from the optical disk 1 including the substrate having the thickness t of 1.2 mm, deterioration in the reading performance can be prevented because the waveform of the signal does not deteriorate considerably even though the overall level of the information signal is lowered.

Since the optical pickup device 3 is structured such that the position is controlled by defocusing the image-formation surface, the waveform of the information signal of the optical disk 1 does not deteriorate. Therefore, the information signal can satisfactorily be read and reproduced. Therefore, the optical pickup device 3 is not required to change the objective lens to be adaptable to optical disks including substrates having different thicknesses t or to use hologram or the like. Simply by changing set values of the focus bias of the servo circuit 6 when the objective lens 9 is subjected to the focusing control, a satisfactory information signal can be obtained by using the same objective lens. To change the focus bias, a detection mechanism may be employed to determine whether the optical disk loaded into the reproducing apparatus is an optical disk including the substrate having the thickness of 1.2 mm or an optical disk including the substrate having the thickness of 0.6 mm. In place of using the detection mechanism, focus control is initially performed with a focus bias adaptable to the optical disk including the substrate having the thickness t of 1.2 mm; if the focusing control cannot be performed, then the focus bias is switched to a value adaptable to the optical disk including the substrate having the thickness t of 0.6 mm.

Figure 7:
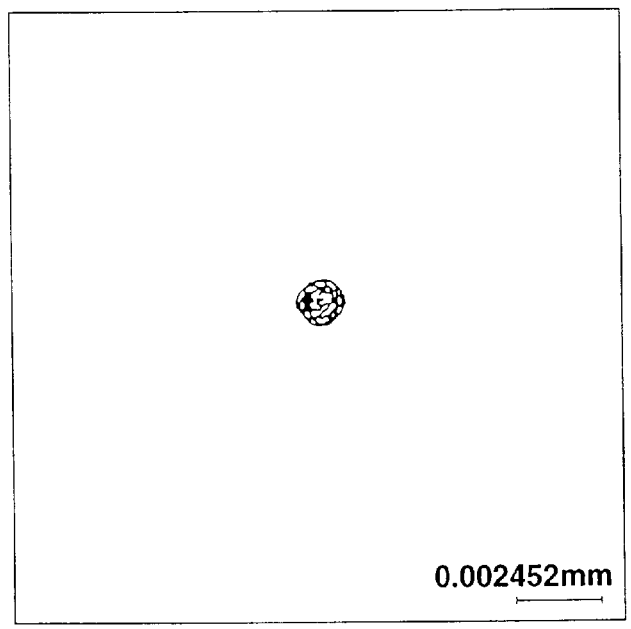
FIG. 7 is a diagram showing the shape of a bean spot formed when the optical disk having t=1.2 mm has been reproduced by an objective lens of the optical pickup device set such that λ=532 nm, NA=0.53 and t=0.6 mm.
Figure 8:
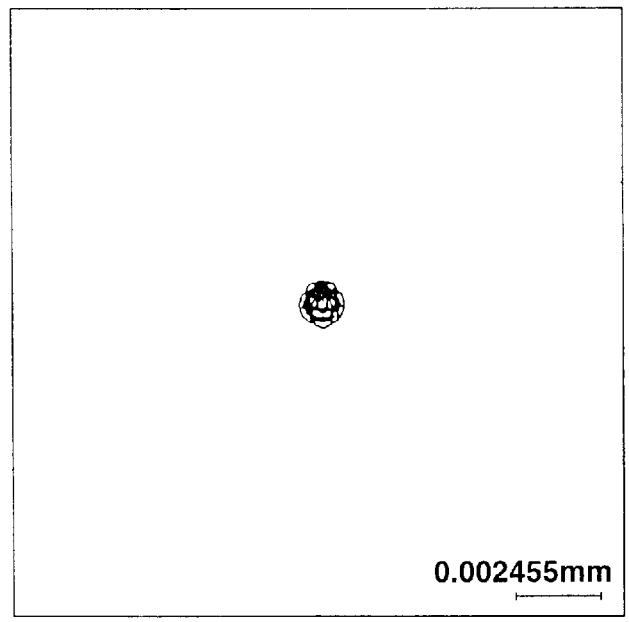
FIG. 8 is a diagram showing the shape of a beam spot formed when the optical disk having t=1.2 mm has been reproduced by an objective lens of the optical pickup device set such that λ=532 nm, NA=0.53 and t=0.6 mm in a state where the optical disk is inclined by an angle of 1°.

An influence of comatic aberration occurring due to disk skew in the optical pickup device 3 will now be described with reference to the drawings. FIG. 7 shows the shape of a beam spot of the optimum MTF image surface B formed when the optical disk 1 having t=1.2 mm has been reproduced by the objective lens 9 set to an optical disk arranged such that the wavelength $\lambda$ is 532 nm, the numerical aperture NA is 0.53 and the substrate thickness t is 0.6 mm. FIG. 8 shows the shape of a beam spot formed when the optical disk 1 having t=1.2 mm has been reproduced by the objective lens 9 set to an optical disk arranged such that the wavelength $\lambda$ is 532 nm, the numerical aperture NA is 0.53 and the substrate thickness t is 0.6 mm in such a manner that the optical disk is inclined by an angle of 1°. As shown in FIGS. 7 and 8, the influence of inclination of the optical disk, that is, the influence of the comatic aberration occurring due to so-called disk skew does not excessively deteriorate the shape of the beam spot.

Figure 9:
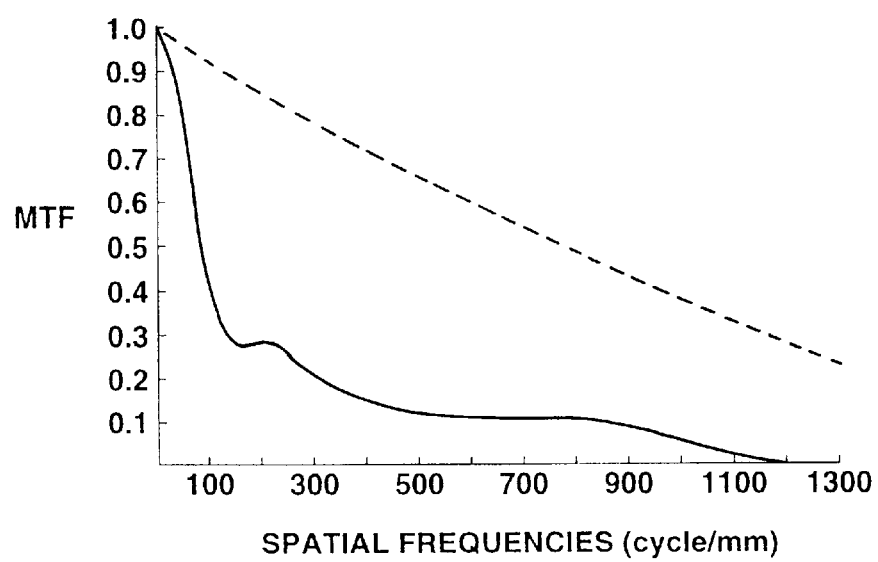
FIG. 9 is a graph showing an MTF curve of optimum MTF image surfaces realized when the optical disk having t=1.2 mm has been reproduced by an objective lens of the optical pickup device set such that λ=532 nm, NA=0.53 and t=0.6 mm in a state where the optical disk is inclined by an angle of 1°.

FIG. 9 shows an MTF curve of optimum MTF image surfaces realized when the optical disk 1 having t=1.2 mm has been reproduced by the objective lens 9 set to an optical disk arranged such that the wavelength $\lambda$ is 532 nm, the numerical aperture NA is 0.53 and the substrate thickness t is 0.6 mm in such a manner that the optical disk is inclined by an angle of 1°. Since the optical pickup device 3 does not encounter considerable deterioration in the MTF and excessive PTF (Phase Transfer Function) occurring due to the comatic aberration caused from disk skew as shown in FIG. 9, deterioration of the quality of the information signal can satisfactorily be prevented. Thus, the skew tolerance can be widened.

As described above, the optical pickup device 3 according to this embodiment has the objective lens 9 set in such a manner that a diffraction limit light beam can be obtained with which a minimum diameter of a beam spot can be realized on a signal recording surface of an optical disk without generation of aberration in a case where the numerical aperture NA is 0.53, the wavelength $\lambda$ of the light beam is 532 nm and the thickness t of the substrate of the optical disk is 0.6 mm; and the servo circuit 6 for controlling the image-formation surface of the light beam to be positioned between the paraxial image surface A and the minimum-wave-aberration image surface C when the optical disk including the substrate having the thickness t of 1.2 mm is reproduced. Thus, the necessity of changing the objective lens to be adaptable to the optical disks including the substrates having different thicknesses t or using a hologram for the objective lens can be eliminated. By simply switching the set focus bias value of the servo circuit 6 when the objective lens 9 is subjected to the focusing control, excellent information signals can be obtained with the same objective lens 9. Therefore, the optical pickup device 3 according to this embodiment does not include a plurality of objective lenses and thus enables the overall structure to be simplified to satisfactorily reproduce optical disks including substrates having different thicknesses t.

Figure 10:
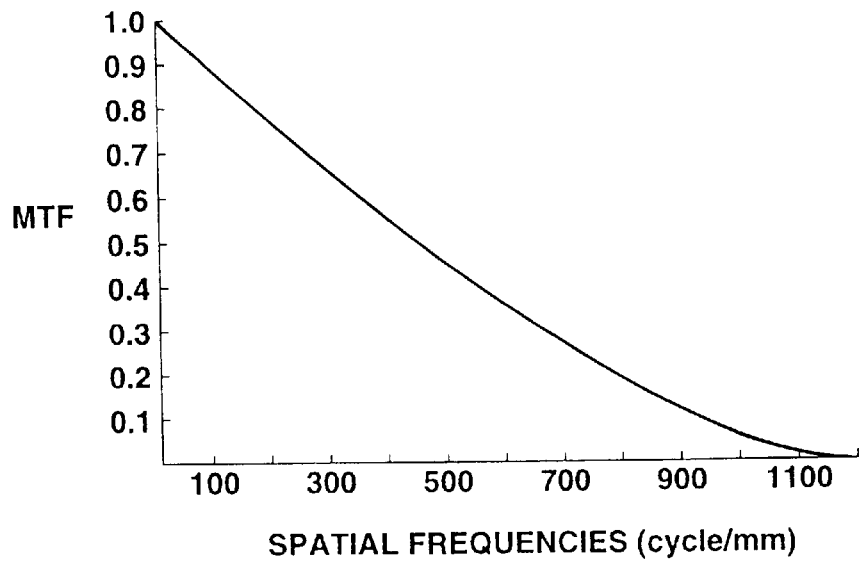
FIG. 10 is a graph showing an MTF curve obtained when an optical disk having t=1.2 mm has been reproduced by an objective lens of the optical pickup device set such that λ=780 nm, NA=0.45 and t=1.2 mm.

MTF curves obtained with the above-mentioned optical pickup device 3 when the wavelength $\lambda$ and the numerical aperture NA are changed will now be described with reference to the drawings. A MTF curve is, as shown in FIG. 10, obtained in a case where the optical disk 1 including the substrate having the thickness t of 1.2 mm is reproduced by an objective lens set such that the wavelength $\lambda$ of the light source 11 is 780 nm, the numerical aperture NA is 0.45 and the thickness t of the substrate of the optical disk is 1.2 mm. As can be understood from FIG. 10, the MTF is not made to be zero in the spatial frequency region of 1100 cycle/mm. Thus, the information signal can satisfactorily be reproduced.

Figure 11:
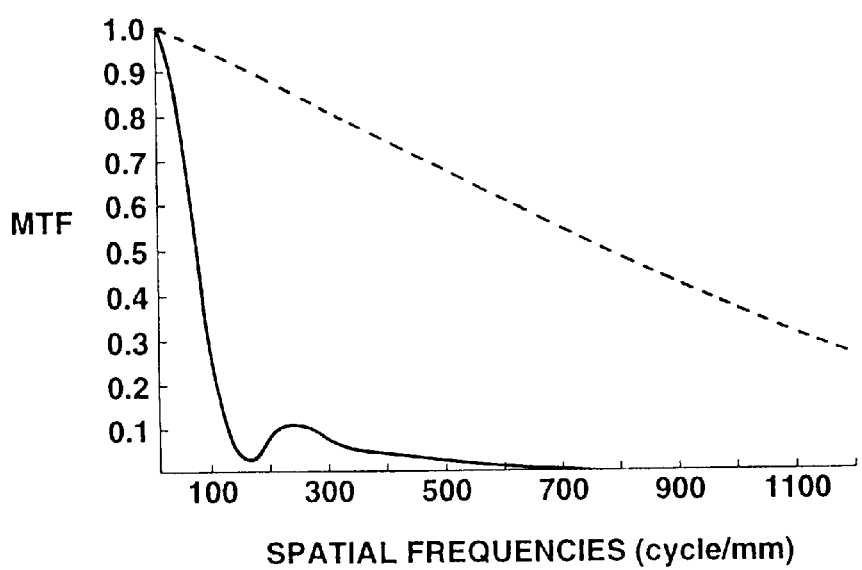
FIG. 11 is a graph showing an MTF curve of paraxial image surfaces realized when an optical disk having t=1.2 mm has been reproduced by an objective lens of the optical pickup device set such that λ=650 nm, NA=0.6 and t=0.6 mm.
Figure 12:
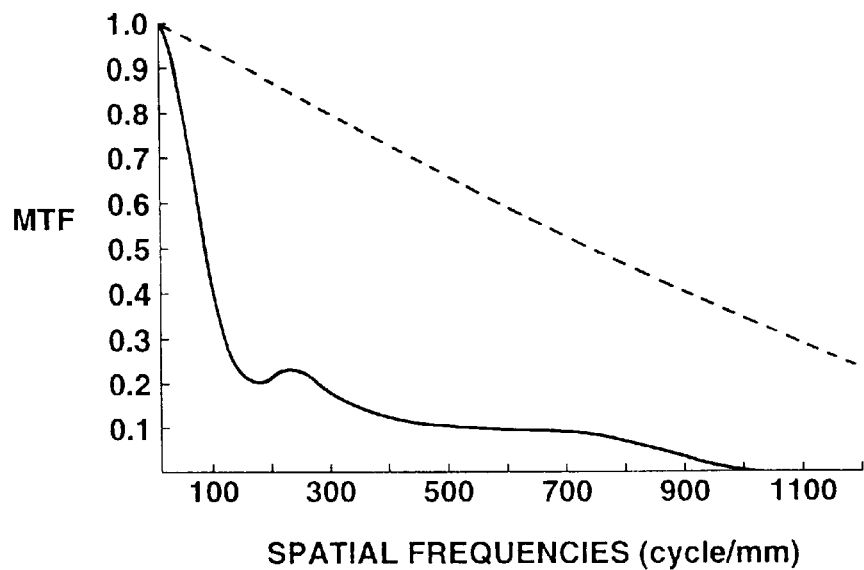
FIG. 12 is a graph showing an MTF curve of optimum MTF surfaces realized when an optical disk having t=1.2 mm has been reproduced by an objective lens of the optical pickup device set such that λ=650 nm, NA=0.6 and t=0.6 mm.
Figure 13:
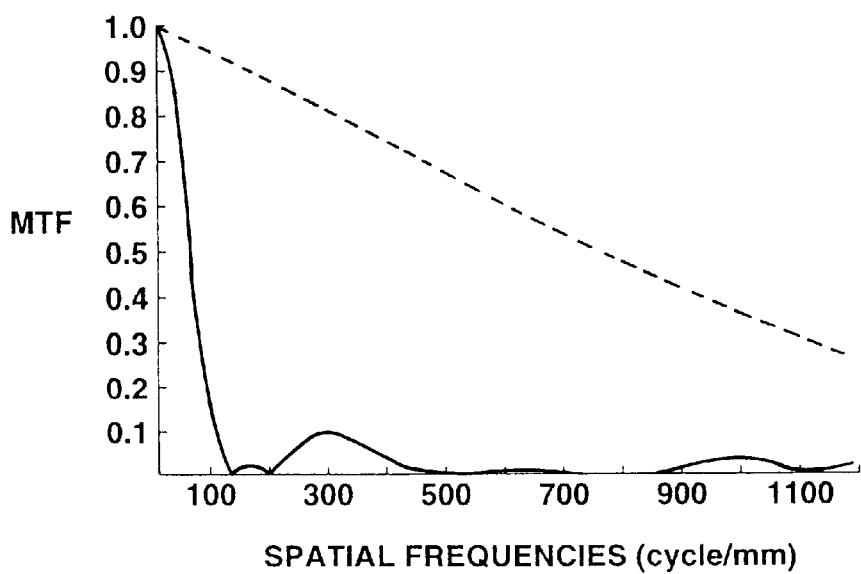
FIG. 13 is a graph showing an MTF curve of minimum-wave-aberration image surfaces when an optical disk having t=1.2 mm has been reproduced by an objective lens of the optical pickup device set such that λ=650 nm, NA=0.6 and t=0.6 mm.

MTF curves obtained in a case where the optical disk 1 including the substrate having the thickness t of 1.2 mm is reproduced by an objective lens set such that the wavelength $\lambda$ of the light source 11 is 650 nm, the numerical aperture NA is 0.6 and the thickness t of the substrate of the optical disk is 0.6 mm will now be described with reference to FIGS. 11, 12 and 13. Note that the ordinate axis shown in each of FIGS. 11 to 13 stands for MTF and the abscissa stands for the spatial frequencies. Referring to FIGS. 11 to 13, continuous lines indicate MTF curves and dashed lines indicate diffraction limit stigmatic MTF.

The MTF curve of paraxial image surfaces A is, as shown in FIG. 11, formed such that the MTF is made to be zero in a spatial frequency region of 700 cycle/mm or higher. The MTF curve of optimum MTF image surfaces B is, as shown in FIG. 12, formed such that the MTF is not made to be zero in a spatial frequency region not lower than 1000 cycle/mm. Note that the position of the optimum MTF image surface B is apart from 10 $\mu$m from the paraxial image surface A. The MTF curve of minimum-wave-aberration image surfaces C is, as shown in FIG. 13, formed such that the MTF is made to be zero in a spatial frequency region not lower than 450 cycle/mm. Note that the position of the minimum-wave-aberration image surface C is apart from 23.75 $\mu$m from the paraxial image surface A.

Therefore, when the objective lens set such that the wavelength $\lambda$ of the light source 11 is 650 nm, the numerical aperture NA is 0.6 and the thickness t of the substrate is 0.6 mm is used to reproduce the optical disk 1 including the substrate having the thickness t of 1.2 mm, the overall deterioration of the information signal is reduced. Since the signal waveform does not deteriorate excessively, deterioration in the jitter indicating the reading performance can be prevented.

Figure 14:
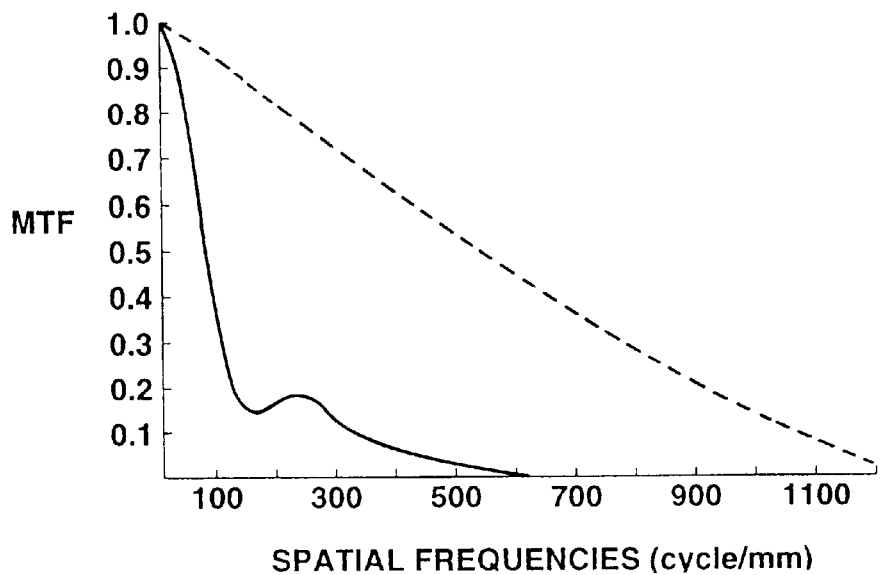
FIG. 14 is a graph showing an MTF curve of paraxial image surfaces realized when an optical disk having t=1.2 mm has been reproduced by an objective lens of the optical pickup device set such that λ=680 nm, NA=0.45 and t=0.6 mm.
Figure 15:
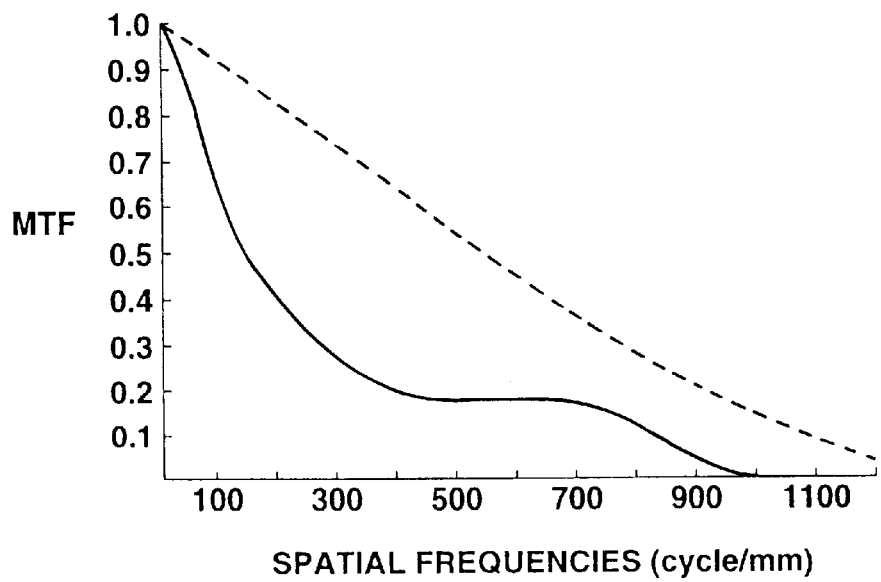
FIG. 15 is a graph showing an MTF curve of optimum MTF surfaces realized when an optical disk having t=1.2 mm has been reproduced by an objective lens of the optical pickup device set such that λ=680 nm, NA=0.45 and t=0.6 mm.
Figure 16:
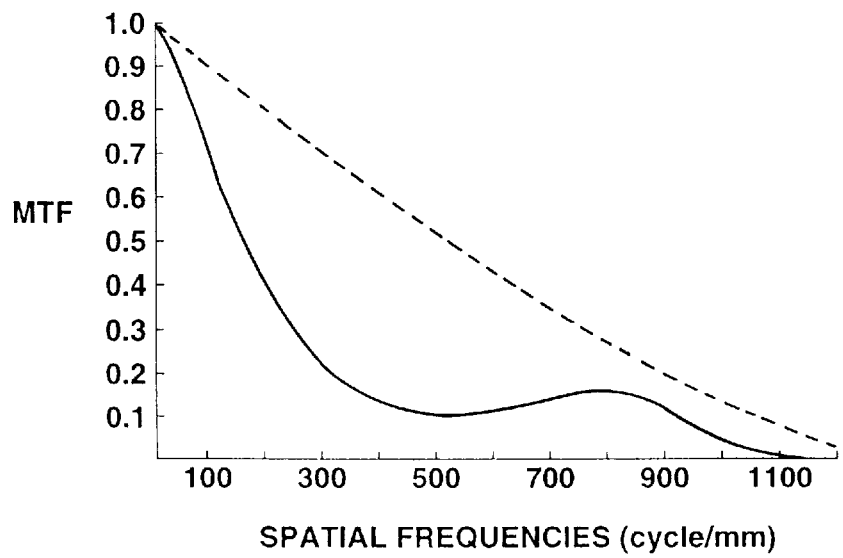
FIG. 16 is a graph showing an MTF curve of minimum-wave-aberration image surfaces realized when an optical disk having t=1.2 mm has been reproduced by an objective lens of the optical pickup device set such that λ=680 nm, NA=0.45 and t=0.6 mm.

MTF curves obtained in a case where the optical disk 1 including the substrate having the thickness t of 1.2 mm is reproduced by an objective lens set such that the wavelength $\lambda$ of the light source 11 is 680 nm, the numerical aperture NA is 0.45 and the thickness t of the substrate of the optical disk is 0.6 mm will now be described with reference to FIGS. 14, 15 and 16. Note that the ordinate axis shown in each of FIGS. 14 to 16 stands for MTF and the abscissa stands for the spatial frequencies. Referring to FIGS. 14 to 16, continuous lines indicate MTF curves and dashed lines indicate diffraction limit stigmatic MTF.

The MTF curve of the paraxial image surfaces A is, as shown in FIG. 14, formed such that the MTF is made to be zero in a spatial frequency region not lower than 650 cycle/mm. The MTF curve of the optimum MTF image surfaces 13 is, as shown in FIG. 15, formed such that the MTF is not made to be zero in the spatial frequency region not lower than 950 cycle/mm. Note that the position of the optimum MTF image surface B is apart from 10.5 μm from the paraxial image surface A. The MTF curve of the minimum-wave-aberration image surfaces C is, as shown in FIG. 16, formed such that the MTF is not made to be zero in a spatial frequency region not lower than 1100 cycle/mm. Note that the position of the minimum-wave-aberration image surface C is apart from 12.5 μm from the paraxial image surface A.

Figure 17:
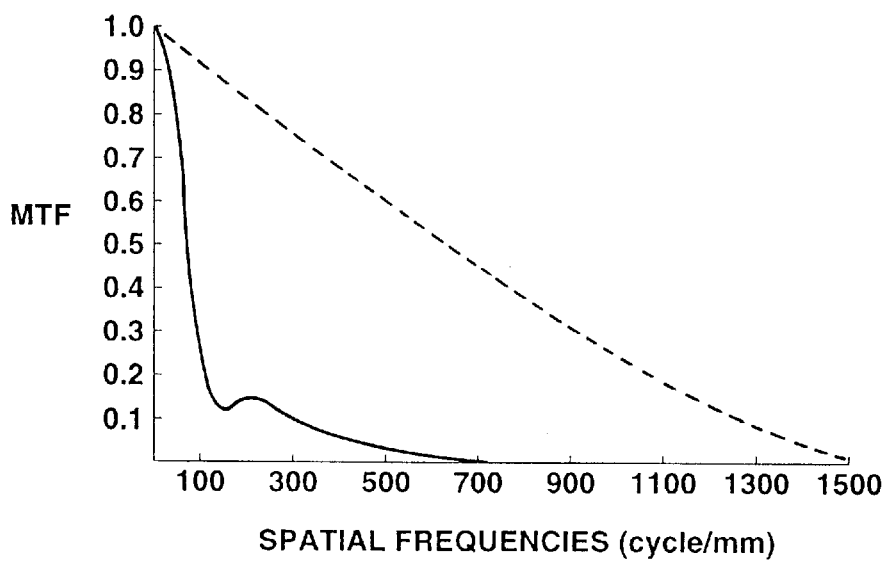
FIG. 17 is a graph showing an MTF curve of paraxial image surfaces realized when an optical disk having t=1.2 mm has been reproduced by an objective lens of the optical pickup device set such that λ=700 nm, NA=0.55 and t=0.8 mm.
Figure 18:
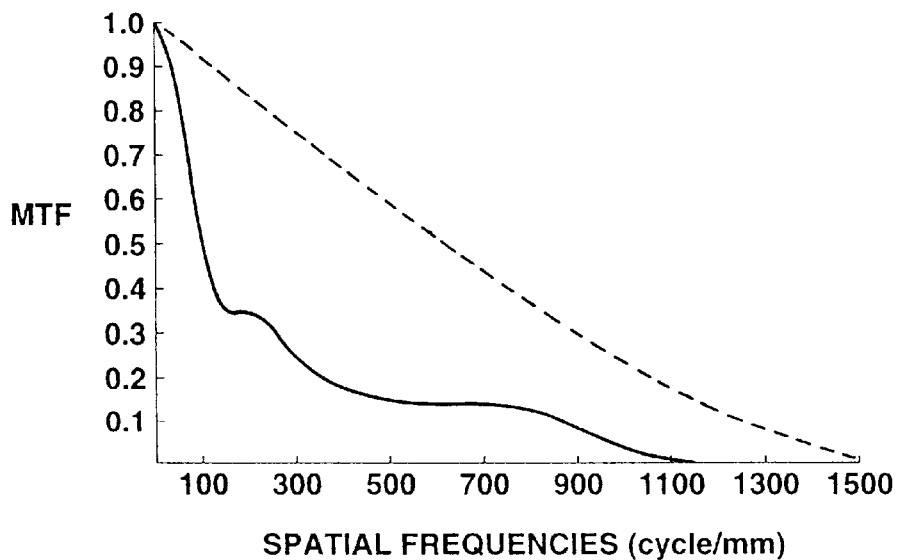
FIG. 18 is a graph showing an MTF curve of optimum MTF surfaces realized when an optical disk having t=1.2 mm has been reproduced by an objective lens of the optical pickup device set such that λ=700 nm, NA=0.55 and t=0.8 mm.
Figure 19:
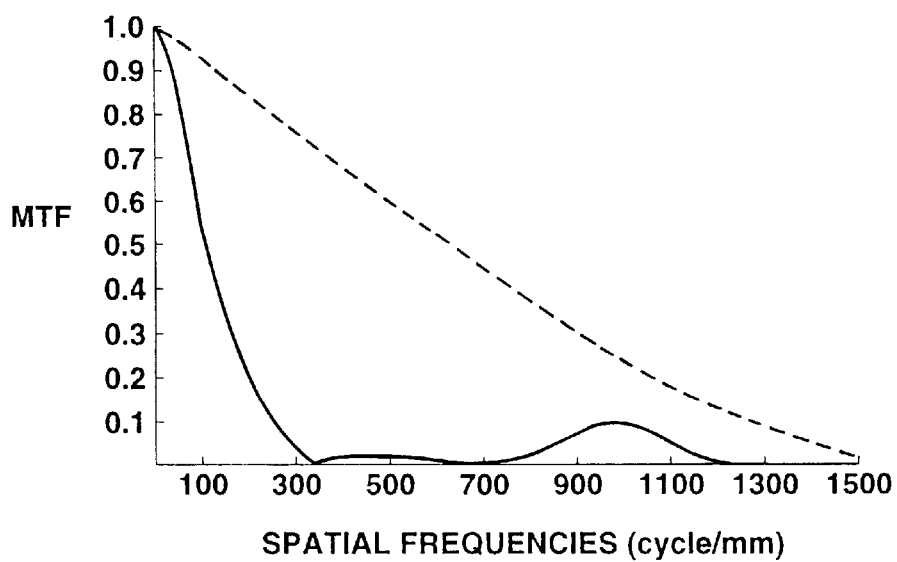
FIG. 19 is a graph showing an MTF curve of minimum-wave-aberration image surfaces realized when an optical disk having t=1.2 mm has been reproduced by an objective lens of the optical pickup device set such that λ=700 nm, NA=0.55 and t=0.8 mm.

Therefore, when the objective lens set such that the wavelength λ of the light source 11 is 680 nm, the numerical aperture NA is 0.45 and the thickness t of the substrate is 0.6 mm is used to reproduce the optical disk 1 including the substrate having the thickness t of 1.2 mm, the overall deterioration of the information signal is reduced. Since the signal waveform does not deteriorate excessively, deterioration in the reading performance can be prevented. Finally, MTF curves obtained in a case where the optical disk 1 including the substrate having the thickness t of 1.2 mm is reproduced by an objective lens set such that the wavelength λ of the light source 11 is 700 nm, the numerical aperture NA is 0.55 and the thickness t of the substrate of the optical disk is 0.8 mm will now be described with reference to FIGS. 17, 18 and 19. Note that the ordinate axis shown in each of FIGS. 17 to 19 stands for MTF and the abscissa stands for the spatial frequencies. Referring to FIGS. 17 to 19, continuous lines indicate MTF curves and dashed lines indicate diffraction limit stigmatic MTF.

The MTF curve of the paraxial image surfaces A is, as shown in FIG. 17, formed such that the MTF is made to be zero in a spatial frequency region not lower than 700 cycle/mm. The MTF curve of the optimum MTF image surfaces B is, as shown in FIG. 18, formed such that the MTF is made to be zero in the spatial frequency region not lower than 1100 cycle/mm. Note that the position of the optimum MTF image surface B is apart from 9 μm from the paraxial image surface A. The MTF curve of the minimum-wave-aberration image surfaces C is, as shown in FIG. 19, formed such that the MTF is made to be zero in a spatial frequency region around 350 cycle/mm. Note that the position of the minimum-wave-aberration image surface C is apart from 12.9 μm from the paraxial image surface A.

Assuming that the operation distance of the objective lens 9 with respect to the high density recording optical disk including the substrate having the thickness t is W1 and the refractive index of a transparent layer of the substrate of the optical disk is n, the operation distance W2 of the objective lens 9 with respect to the optical disk 1 including the substrate having the thickness t of 1.2 mm is calculated by the following equation:

$$W2=W1-(1.2-t)/n$$

In order to prevent movement of the objective lens 9 when an information signal is read and reproduced from two types of optical disks respectively including substrates having different thicknesses t, the position of the signal reading surface of the high recording density optical disk including the substrate having the thickness t is required to be determined to be apart from the signal reading surface of the optical disk 1 including the substrate having the thickness t of 1.2 mm for a distance obtained by adding a distance calculated by the following formula:

$$(1.2-t)/n$$

Although the optical pickup device according to the present invention has been described such that it is applied to the optical disk reproducing apparatus, the present invention can be applied to an optical pickup device for use in an optical disk recording and reproducing apparatus for recording and reproducing data to and from, for example, a magneto-optical disk. The optical disk to be reproduced by the optical pickup device according to the present invention is not limited to the single layer optical disk. As a matter of course, for example, a multi-layer optical disk may be employed which has a plurality of information signal layers such that the information signal layers are formed at a position apart from the signal reading surface for a distance of 1 mm or shorter.

As described above, the optical pickup device according to the present invention has a light source for emitting light beams, an objective lens having minimum aberration when the light beam has a wavelength not longer than 700 nm, the numerical aperture is 0.45 or larger and the thickness of the substrate of the optical recording medium is not larger than 1 mm, and control means for controlling the image forming surface of the light beam to be positioned between the paraxial image surface and the minimum-wave-aberration image surface when an information signal is reproduced from an optical recording medium including a substrate having a thickness larger than 1 mm. Therefore, information signals can satisfactorily be reproduced from two types of optical disks respectively including substrates having different thicknesses.

What is claimed is:

1. A reproducing apparatus for an optical recording medium for reproducing data from a first optical recording medium consisting of a substrate having a thickness of 1.2 mm and data from a second optical recording medium consisting of a substrate having a thickness of 1.0 mm or smaller, the apparatus comprising:

a light source for emitting a plurality of Nth order light beams each having a wavelength of 700 nm or shorter, where N= . . . −2, −1, 0, 1, 2 . . . ;

an objective lens for focusing the light beams emitted from the light source through the substrate of one of the first and second optical recording media, the objective lens having a numerical aperture of 0.45 or larger; and control means for controlling the objective lens so that a first information surface on which the light beams are focused by the objective lens is positioned between a first paraxial image surface and a first minimum-wave-aberration image surface when the data from the first optical recording medium is reproduced, and for controlling the objective lens so that a second information surface on which the light beams are focused by the objective lens is positioned between a second paraxial image surface and a second minimum-wave-aberration image surface when the data from the second optical recording medium is reproduced, wherein the control means includes a focus control portion for controlling a position of the objective lens in a direction parallel to an optical axis of the objective lens.

2. The reproducing apparatus for an optical recording medium according to claim 1, wherein the control means further includes means for changing a bias value of the focus control portion to position the surface on which the light beams are focused by the objective lens between the paraxial image surface and the minimum-wave-aberration image surface.

3. The reproducing apparatus for an optical recording medium according to claim 1, wherein the thickness of the second optical recording medium including the substrate having a thickness of 1.0 mm or smaller is t, a refractive index of the substrate is n, and a distance from the objective lens to the substrate of the second optical recording medium when data from the second optical recording medium is reproduced is W1, a distance W2 from the objective lens to the substrate of the first optical recording medium including the substrate having the thickness of 1.2 mm when data from the first optical recording medium is reproduced is expressed as follows:

$$W2=W1-(1.2-t)/n.$$

4. The reproducing apparatus for an optical recording medium according to claim 1, wherein the wavelength of the light beams emitted from the light source is in the range of 532 nm to 700 nm.

5. The reproducing apparatus for an optical recording medium according to claim 4, wherein the numerical aperture of the objective lens is in the range of 0.45 to 0.6.

6. The reproducing apparatus for an optical recording medium according to claim 1, wherein the light source includes a laser for producing a single light beam and a diffraction grating for splitting the single light beam into the plurality of Nth order light beams.

7. A reproducing apparatus for an optical recording medium for reproducing data from a first optical recording medium consisting of a substrate having a thickness of 1.2 mm and data from a second optical recording medium consisting of a substrate having a thickness of 1.0 mm or smaller, the apparatus comprising:

a light source for emitting a plurality of Nth order light beams each having a wavelength of 700 nm or shorter, where N= . . . -2, -1, 0, 1, 2 . . . ;

an objective lens for focusing the light beams emitted from the light source through the substrate of one of the first and second optical recording media, the objective lens having a numerical aperture of 0.45 or larger; and control means for controlling the objective lens so that a first information surface on which the light beams are focused by the objective lens is positioned between a first paraxial image surface and a first minimum-wave-aberration image surface when data from the first optical recording medium is reproduced, and for controlling the objective lens so that a second information surface on which the light beams are focused by the objective lens is positioned between a second paraxial image surface and a second minimum-wave-aberration image surface when the data from the second optical recording medium is reproduced, wherein the thickness of the second optical recording medium consisting of the substrate having a thickness of 1.0 mm or smaller is t, a refractive index of the second optical recording medium substrate is n, and when data from the second optical recording medium consisting of the substrate having the thickness of 1.0 mm or smaller is reproduced, the objective lens is disposed apart from the substrate of the first optical recording medium when data from the first optical recording medium including a substrate having a thickness of 1.2 mm is reproduced by a distance expressed as:

(1.2-t)/n.

8. An optical pickup device for reading first and second optical recording media respectively including a substrate having a thickness of 1.2 mm and a substrate having a thickness of 1.0 mm or smaller, the device comprising:

a light source for emitting a plurality of Nth order light beams having a wavelength of 700 nm or shorter, where N= . . . -2, -1, 0, 1, 2 . . . ;

an objective lens for focusing the plurality of Nth order light beams emitted from the light source through the substrate of one of the first and second optical recording media, the objective lens having a numerical aperture of 0.45 or larger; and means for performing control of the objective lens such that a first information surface on which the light beams are focused by objective lens is positioned between a first paraxial image surface and a first minimum-wave-aberration image surface of the plurality of focused beams when data is recorded and/or reproduced to and from the first optical recording medium, and for performing control of the objective lens such that a second information surface on which the light beams are focused by the objective lens is positioned between a second paraxial image surface and a second minimum-wave-aberration image surface of the plurality of focused beams when data is recorded and/or reproduced to and from the second optical recording medium, wherein the control means includes a focus control portion for controlling the objective lens in a direction parallel to an optical axis of the objective lens, the thickness of the second optical recording medium consisting of the substrate having the thickness of 1.0 mm or smaller is t, a refractive index of the second optical recording medium substrate is n, and when data from the second optical recording medium consisting of the substrate having the thickness of 1.0 mm or smaller is reproduced, the objective lens is disposed apart from the substrate of the first optical recording medium when data from the first optical recording medium including the substrate having a thickness of 1.2 mm is reproduced by a distance expressed as:

(1.2-t)/n, and when a distance from the objective lens to the substrate of the second optical recording medium including the substrate having the thickness of 1.0 mm or smaller when data from the second optical recording medium including the substrate having the thickness of 1.0 mm or smaller is reproduced is W1, a distance W2 from the objective lens to the substrate of the first optical recording medium including the substrate having the thickness of 1.2 mm when data from the optical recording medium including the substrate having the thickness of 1.2 mm is reproduced is expressed as follows:

$$W2=W1-(1.2-t)/n.$$

9. The optical pickup device according to claim 8, wherein the wavelength of the light beams emitted from the light source in the range of 532 nm to 700 nm.

10. The optical pickup device according to claim 9, wherein the numerical aperture of the objective lens is in the range of 0.45 to 0.6.

11. The reproducing apparatus for an optical recording medium according to claim 8, wherein the light source includes a laser for producing a single light beam and a diffraction grating for splitting the single light beam into the plurality of Nth order light beams.

* * * * *